United States Patent
Jeng et al.

(10) Patent No.: US 9,147,092 B2
(45) Date of Patent: Sep. 29, 2015

(54) ANTI-COUNTERFEITING SYSTEM AND METHOD OF E-TICKET

(71) Applicant: Chunghwa Telecom Co., Ltd, Yangmei, Taoyuan County (TW)

(72) Inventors: Wei-Herng Jeng, Yangmei (TW); Ta-Wei Chien, Yangmei (TW); Gwo-Hwa Ju, Yangmei (TW)

(73) Assignee: CHUNGHWA TELECOM CO., LTD., Yangmei, Taoyuan County (TW)

( * ) Notice: Subject to any disclaimer, the term of this patent is extended or adjusted under 35 U.S.C. 154(b) by 157 days.

(21) Appl. No.: 13/759,755

(22) Filed: Feb. 5, 2013

(65) Prior Publication Data

US 2013/0313314 A1 Nov. 28, 2013

(30) Foreign Application Priority Data

May 28, 2012 (TW) .............................. 101119018 A

(51) Int. Cl.
| | |
|---|---|
| G07F 17/00 | (2006.01) |
| G06K 5/00 | (2006.01) |
| G06Q 20/04 | (2012.01) |
| G06Q 20/32 | (2012.01) |
| G07B 15/00 | (2011.01) |

(52) U.S. Cl.
CPC .............. *G06K 5/00* (2013.01); *G06Q 20/0457* (2013.01); *G06Q 20/322* (2013.01); *G07B 15/00* (2013.01)

(58) Field of Classification Search
CPC .... G06Q 30/02; G06Q 20/341; G07F 7/1008; G06K 7/10; G06K 7/10693; G06K 7/14; G06K 7/10851; G06K 19/06028; G06K 7/10871; G06K 2019/06243; G06K 7/10881; G06K 17/0022

USPC ............ 235/462.13, 472.01, 472.02, 472.03, 235/462.45, 462.46, 380, 375; 705/71
See application file for complete search history.

(56) References Cited

U.S. PATENT DOCUMENTS

| | | | |
|---|---|---|---|
| 2013/0084935 | A1* | 4/2013 | DePaul et al. .................... 463/17 |
| 2014/0052640 | A1* | 2/2014 | Pitroda et al. .................... 705/67 |

FOREIGN PATENT DOCUMENTS

| | | |
|---|---|---|
| TW | 504659 | 10/2002 |
| TW | 200832262 | 8/2008 |
| TW | M354810 | 4/2009 |
| TW | M410932 | 9/2011 |

* cited by examiner

*Primary Examiner* — Karl D Frech
(74) *Attorney, Agent, or Firm* — Muncy, Geissler, Olds & Lowe, P.C.

(57) ABSTRACT

An anti-counterfeiting system and method for an e-ticket are disclosed. The anti-counterfeiting system includes a ticket service center, a handheld device, a ticket checking device, and a database. The ticket checking device identifies the e-ticket information shown on a display of the handheld device at least twice. The e-ticket is verified by using the handheld device to execute a ticket software including an e-ticket service. The handheld device obtains at least one e-ticket information from the ticket service center via a network link. When the display of the handheld device shows that the e-ticket information is read by the ticket checking device and is verified by the database, the ticket service center transmits an e-ticket verification information to the handheld device, and the display of the handheld device then shows the e-ticket information for the ticket checking device to check again.

13 Claims, 2 Drawing Sheets

ANTI-COUNTERFEITING SYSTEM AND METHOD OF E-TICKET

BACKGROUND OF THE INVENTION

1. Field of the Invention

The present invention relates to an anti-counterfeiting system and method, and more particularly, to an anti-counterfeiting system and method of an e-ticket.

2. Description of the Prior Art

Traditionally, tickets are printed on paper. However, technology has evolved and tickets are now provided with various electronic barcodes and images for better identification. In the prior art technique of Taiwan Patent No. 504659 entitled, "Electronic bar code service system and procedure," an e-ticket verification service using a handheld device is disclosed. However, in this document, only one e-ticket can be verified at a time and the e-ticket could be copied easily for illegal use. In the prior art technique of Taiwan Patent Application No. 200832262 entitled, "Management system of e-ticket," a barcode scanner connected to a decryption device is disclosed, for providing an input interface for a user to enter a password before the scanner can read the complete e-ticket information. This password is set by the user during the ticket booking process. However, there are a few disadvantages since a public keyboard is used for input. In particular, the user has to input the password during the ticket booking and verification process, the password is a prerequisite for verification, the password could be stolen during the ticket booking and verification process, the image of the ticket could be stolen as well, and there could be health concerns in using a public keyboard, for example, severe acute respiratory syndrome (SARS) is spread through direct contact. Taiwan Design Patent No. M354810 entitled, "Verification system for message conversion barcode," and Taiwan Design Patent No. M410932 entitled, "Mobile device capable of displaying barcode for electronic transaction and integrated circuit film thereof," both disclose the use of a one-time password (OTP) by transmitting the OTPs to a mobile phone and converting the OTP into barcodes for display, thereby providing barcode images of the e-ticket on mobile phones for verification. However, the images could be stolen or misused and cause security problems.

Therefore, the traditional anti-counterfeiting system and method of the prior art presents several shortcomings to be overcome.

In view of the above-described deficiencies of the traditional anti-counterfeiting system and method, after years of constant effort in research, the inventor of the present invention has consequently developed and proposed an anti-counterfeiting system and method for use with e-tickets in the present invention.

SUMMARY OF THE INVENTION

It is an object of the present invention to provide an anti-counterfeiting system and method for use with e-tickets to provide a safe, quick and convenient service system to prevent security problems caused by stolen or misused images of the e-ticket shown on a handheld device.

In order to achieve the above object, the present invention provides an anti-counterfeiting system and method for use with e-tickets, wherein a ticket checking device of the e-ticket anti-counterfeiting system checks the e-ticket information shown on the display of the handheld device at least twice to prevent e-ticket counterfeiting. The e-ticket information can be an encrypted or non-encrypted text/number, barcode, image, one-time password (OTP), or a combination thereof.

The e-ticket anti-counterfeiting method comprises the following steps.

The user uses the handheld device to download and install a ticket software from the ticket service center, or the user can use the built-in ticket software of the handheld device.

The ticket software of the handheld device connects to the ticket service center to submit an e-ticket service demand and obtains at least one e-ticket information, wherein the e-ticket information can be an encrypted or non-encrypted text/number, barcode, image, one-time password (OTP), or a combination thereof. The e-ticket information can also be a barcode image generated by the barcode encoding module of the handheld device based on an encrypted or non-encrypted text/number, barcode, image, OTP, or a combination thereof. There are generally two types of e-ticket information. The first type is that the e-ticket information is stored in the handheld device, which means that the e-ticket information is downloaded to the handheld device from the ticket service center. The other type is that the e-ticket information is stored in the ticket service center and is downloaded to the handheld device whenever it is needed.

The first time that the e-ticket information shown by the handheld device is read by the e-ticket checking device and verified by the database to be true, the ticket service center sends an e-ticket verification information to the handheld device for the display of the handheld device to show the e-ticket information and for the ticket checking device to check again, thereby providing an e-ticket anti-counterfeiting effect. The ticket service center further sends a ticket verification information to the handheld device by (1) a push notification service, such as Android™ Push Notification, Apple® Push Notification, and Windows® phone Push Notification, to notify the handheld device and to inform the handheld device for further verification action, wherein the push notification service can return an e-ticket verification information to the handheld device, or (2) using a network communication record, wherein the ticket service center queries a database of a carrier for reverse IP lookup of the dynamic IP to verify the phone number of the handheld device and then returns the e-ticket verification information to the handheld device according to the phone number or the dynamic IP, or (3) using a short message service (SMS), (4) using a multimedia messaging system (MMS), or (5) using an e-mail service, or (6) when the handheld device is connected to the ticket service center via the network, the ticket service center sends the e-ticket verification information to the handheld device via a unique identification (ID) generated by the ticket service center, wherein the unique ID is generated to identify the handheld device, or (6) using other communication mechanisms.

When the handheld device receives an e-ticket verification information, the ticket software automatically shows the e-ticket verification information on the display of the handheld device for the ticket checking device to read and for the database of the ticket service center to verify whether it is the e-ticket shown on the handheld device, thereby assuring that the re-verification process is legitimate. Furthermore, if the e-ticket is copied by an image capturing device and misused, the anti-counterfeiting system can issue an alert and notify related personnel. Therefore, the anti-counterfeiting system and method can be used in a paperless e-ticket verification, access control or other applications, wherein the e-ticket information can be an encrypted or non-encrypted text/number, barcode, image, OTP, or a combination thereof, or a barcode image generated by the barcode encoding module of the handheld device based on encrypted or non-encrypted text/number, barcode, image, OTP, or a combination thereof.

If the e-ticket is further applied in a payment service using an ATM card or a credit card, the ticket service center would automatically reply with transaction confirmation information to the handheld device via the network and let the user choose what kind of cards (ATM card, credit card, or other cards) and which card with which to pay for the transaction, such as deducting an amount from an ATM card or choosing a credit card for the transaction payment, wherein the user can submit the card number and other data to the database of the ticket service center via the handheld device. The ticket service center can check the validity of the card with a payment platform (provided by a card issuing bank or organization). The card number and other data can be stored in a handheld device or a remote database.

When the user confirms the payment method and then agrees to the transaction, the ticket service center determines whether the transaction is completed. If the payment method and card information are verified, the ticket service center replies with a transaction message to indicate the status of the transaction to the handheld device to verify the validity of the transaction method, and vice versa.

The e-ticket anti-counterfeiting system comprises a ticket service center for providing a ticket service, such as a payment service (ATM card deduction or credit card payment, for example), an electronic wallet (stored value, expenditure, transfer, or query), an automated ticket pass, a coupon ticket, a membership card for bonus accumulation, a bonus exchange, a coupon and so on, a ticket checking device for checking an e-ticket information or an e-ticket verification information shown on the display of the handheld device at least twice to verify whether the e-ticket is correct and valid, a handheld device for connecting to the ticket service center to obtain the e-ticket information or the e-ticket verification information for the e-ticket application, and a database for storing data such as user information (account, password, or e-mail address), handheld device information (phone number, international mobile subscriber identify (IMSI) or international mobile equipment identity number (IMEI), and IP), and e-ticket transaction information (ticket booking, purchasing, or other user transaction record). When used in a financial application, the e-ticket anti-counterfeiting system further comprises a payment platform for conducting an electronic transaction with an ATM card, credit card, or other type of cards on the handheld device.

Therefore, the e-ticket anti-counterfeiting system and method comprises a ticket service center for providing an e-ticket application service, a ticket checking device comprising a communication module, an image module, and an recognizing module, wherein the image module identifies the e-ticket information or the e-ticket verification information on a display of a handheld device at least twice, and the recognizing module verifies whether the e-ticket information or the e-ticket verification information on the display of the handheld device is correct and valid. The handheld device comprises a transmission module and a ticket software, wherein the transmission module connects to the ticket service center via a network and obtains the e-ticket information or the e-ticket verification information for the recognizing module to verify whether the e-ticket information or the e-ticket verification information is correct and valid, and a database comprising a comparing module, wherein the database stores a user information, handheld device information, or e-ticket transaction information.

In the present invention, the e-ticket anti-counterfeiting system further comprises a payment platform for the handheld device to execute an electronic transaction application such as a payment through a credit card or ATM card.

In the present invention, the handheld device further comprises a barcode encoding module for generating a barcode image for the e-ticket information or the e-ticket verification information, which is a one-time password (OTP) represented by a text/number, barcode, image, or a combination thereof.

In the present invention, the user information comprises an account, password, and e-mail address. The handheld device information comprises a phone number, an international mobile subscriber identify (IMSI), an international mobile equipment identity number (IMEI), and an IP. The e-ticket transaction information comprises a ticket booking data, purchasing data, and user transaction behavior.

In the present invention, the handheld device can be a mobile phone, a tablet PC, a personal digital assistant (PDA), an Apple® iPad, an Apple® iPod®, or other handheld devices having a communication module.

An e-ticket anti-counterfeiting method comprises at least the following steps:

executing a ticket software of a handheld device and using a transmission module of the handheld device to connect to a ticket service center via a network to submit a e-ticket service demand, and then obtaining at least an e-ticket information or an e-ticket verification information for the handheld device;

when the e-ticket information or the e-ticket verification information is read by a ticket checking device, connecting the ticket checking device to a comparing module of a database via a communication module for verifying the e-ticket information or the e-ticket verification information, if true, sending a second e-ticket verification information to the handheld device via the ticket service center;

receiving the e-ticket verification information by the handheld device and showing the second e-ticket verification information on a display of the handheld device for the ticket checking device to verify the second e-ticket verification information;

when the handheld device receives the second e-ticket verification information, showing the e-ticket information or the e-ticket verification information on the display of the handheld device for an image module of the ticket checking device to receive an image of the e-ticket information or the e-ticket verification information, wherein the image is read by an identifying module of the ticket checking device and verified by the database connected with the communication module of the ticket checking device to determine whether the image is the e-ticket information or the e-ticket verification information shown on the display of the handheld device to verify whether the second e-ticket verification information is legitimate.

The present invention further comprises the following steps:

automatically replying with transaction confirmation information by the ticket service center to the handheld device via the network to provide a transaction method by a credit card or a ATM card, wherein the transaction method is performed by sending a card information by the transmission module of the handheld device to the database of the ticket service center and verifying the validity of the card information, and sending the card information by the ticket service center to a payment platform via the network to verify the validity of the card information by a card issuing bank or organization;

wherein the card information is stored in a storing module or a remote database via the network;

verifying the transaction method, if true, after agreeing to the transaction and selecting the credit card or ATM card to pay the e-ticket, replying with a transaction message to indicate the status of the transaction to the handheld device to verify the validity of the transaction method.

In the present invention, the ticket service center sends the e-ticket verification information to the handheld device via a push notification service, wherein the push notification service sends the e-ticket verification information back to the transmission module of the handheld device.

In the present invention, the handheld device obtains the e-ticket information or the e-ticket verification information and divides the e-ticket information or the e-ticket verification information into a first information and a second information. When verifying the e-ticket information or the e-ticket verification information for the first time, the first information is used for first verification. After the second information is verified by the ticket checking device, a push notification service is used for returning the second information to the handheld device for showing the second information on the display of the handheld device. The second information is used for re-verifying the e-ticket information or the e-ticket verification information.

In the present invention, the ticket service center sends the e-ticket verification information to the handheld device according to a network communication record of the handheld device, wherein the ticket service center queries a database of a carrier for reverse IP lookup of the dynamic IP to verify the phone number of the handheld device and then returns the e-ticket verification information to the handheld device according to the phone number or the dynamic IP.

In the present invention, the ticket service center sends the e-ticket verification information to the handheld device via a short message service (SMS) or a multimedia messaging system (MMS).

In the present invention, the ticket service center sends the e-ticket verification information to the handheld device via an e-mail service.

In the present invention, the ticket service center sends the e-ticket verification information to the handheld device via a unique identification (ID) generated by the ticket service center when the handheld device is connected to the ticket service center via the network. When the handheld device is connected to the ticket service center, the unique ID is generated to identify the handheld device.

The present invention further comprises the following steps of sending the e-ticket information or the e-ticket verification information to the handheld device by the ticket service center, wherein the handheld device is connected to the ticket service center via the network for a registration process and wherein a plurality of unique IDs corresponding to a plurality of handheld devices is generated by the ticket service center. When the handheld device is identified by the unique ID, the ticket service center sends the e-ticket information or the e-ticket verification information back to the handheld device via the transmission module of the handheld device.

Therefore, the present invention is advantageous in that:

1. The present invention uses the ticket checking device to verify the e-ticket shown on the display of the handheld device at least twice to achieve an anti-counterfeiting effect and to prevent security problems caused by the e-ticket being copied by image capturing devices and being misused.

2. The present invention provides an e-ticket anti-counterfeiting system and method to not only provide a paperless solution, but also to improve the safety of the use of e-tickets, while achieving quick verification and providing more convenient services.

Furthermore, the user can use the ticket software provided by the handheld device to eliminate the need of carrying many different physical cards.

DETAILED DESCRIPTION OF THE PREFERRED EMBODIMENT

The advantages and innovative features of the invention will become more apparent from the following detailed description when taken in conjunction with the accompanying drawings.

Figure 1:
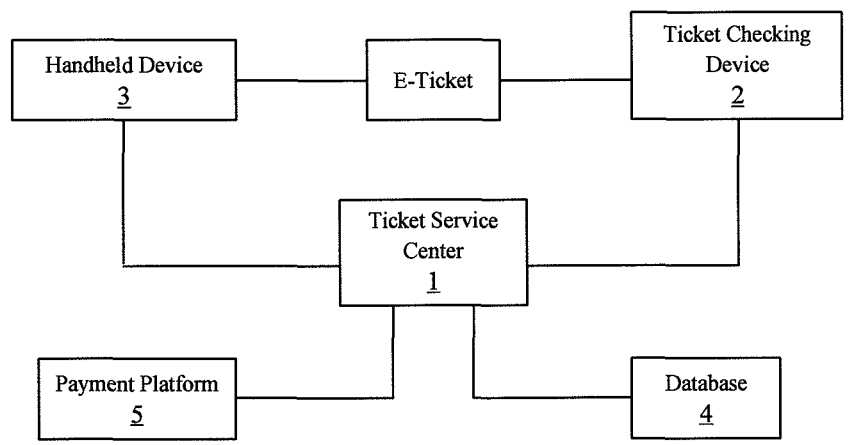
FIG. 1 illustrates a structural diagram of an anti-counterfeiting system for an e-ticket of the present invention.

FIG. 1 provides a structural diagram of an anti-counterfeiting system for an e-ticket of the present invention, which comprises: a ticket service center 1 for providing a ticket service, such as a payment service (ATM card deduction, credit card payment), electronic wallet (stored value, expenditure, transfer, or query), automated ticket pass, coupon ticket, membership card for bonus accumulation, bonus exchange, coupon and so on; a ticket checking device 2 for checking an e-ticket information or an e-ticket verification information shown on the display of the handheld device 3 at least twice to verify whether the e-ticket is correct and valid; the handheld device 3 for connecting to the ticket service center 1 to obtain the e-ticket information or the e-ticket verification information for the e-ticket application; and a database 4 for storing data such as user information (account, password or e-mail address), handheld device information (phone number, international mobile subscriber identify (IMSI) or international mobile equipment identity number (IMEI), and IP), e-ticket transaction information (ticket booking, purchasing, or other user transaction record). When used in a financial application, the e-ticket anti-counterfeiting system further comprises a payment platform 5 for conducting an electronic transaction with an ATM card, credit card or other type of cards on the handheld device 3.

Figure 2:
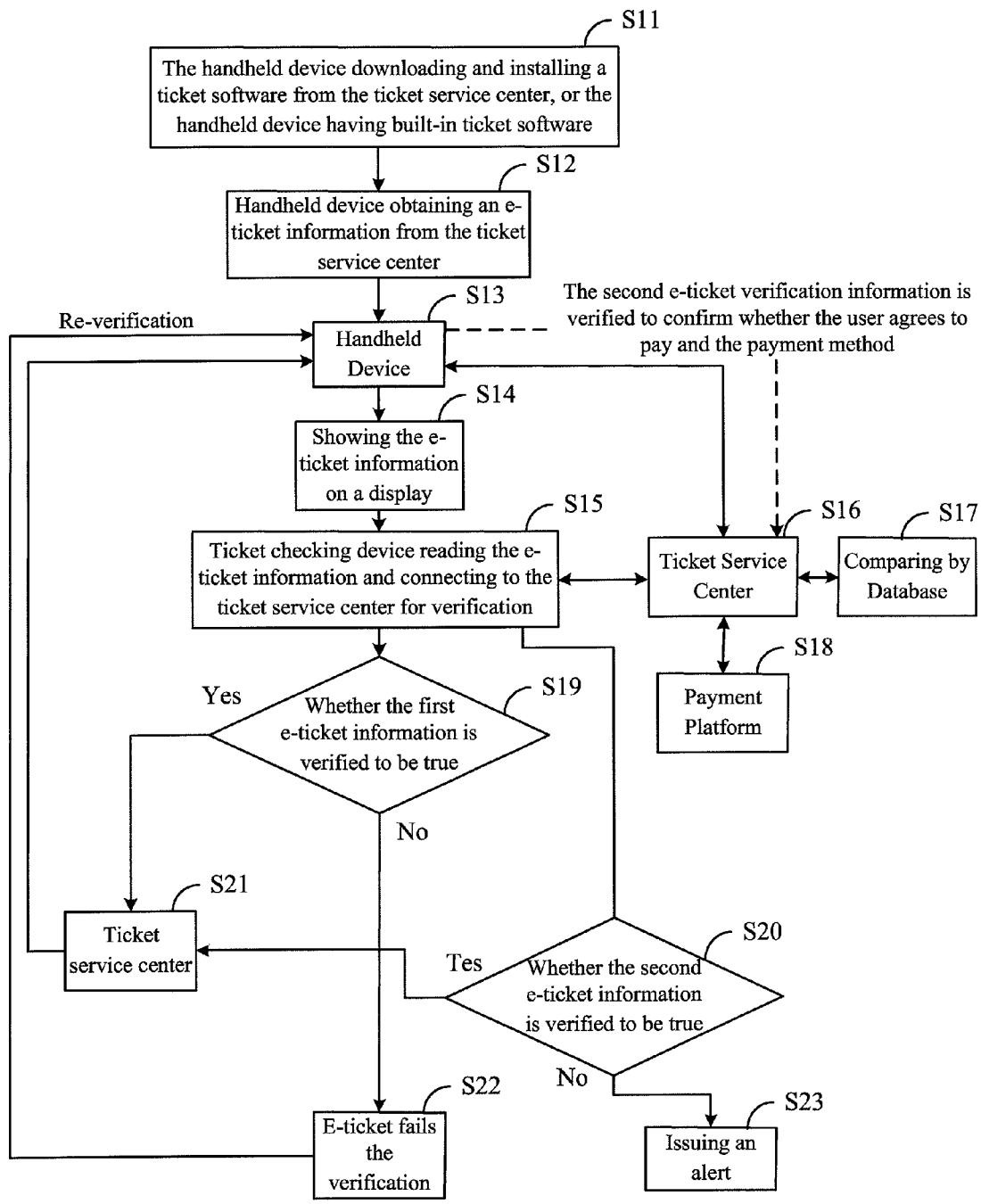
FIG. 2 illustrates a flow chart of an anti-counterfeiting method for the e-ticket of the present invention.

Please refer to FIG. 2 in conjunction with FIG. 1, wherein FIG. 2 illustrates a flow chart of an anti-counterfeiting method for the e-ticket of the present invention, comprising the following steps:

First the process goes to step S11, in which the user uses the handheld device 3 to download and install a ticket software from the ticket service center 1, or the user can use the built-in ticket software of the handheld device 3.

Then, the process goes to step S12 and step S13, in which the ticket software of the handheld device 3 connects to the ticket service center to submit an e-ticket service demand and obtains at least one e-ticket information. The e-ticket information can be an encrypted or non-encrypted text/number, barcode, image, one-time password (OTP), or combination thereof, or can be a barcode image generated by the barcode encoding module of the handheld device 3 based on an encrypted or non-encrypted text/number, barcode, image, OTP, or combination thereof. There are generally two types of e-ticket information. The first type is that the e-ticket information is stored in the handheld device 3. In other words, the e-ticket information is downloaded to the handheld device from the ticket service center 1. Another type is that the e-ticket information is stored in the ticket service center 1 and is downloaded to the handheld device 3 whenever it is needed.

Next, the process goes to steps S14 to S19. The first time when the e-ticket information shown by the handheld device 3 is read by the ticket checking device 2 and verified by the database 4 to be true, the ticket service center 1 sends an e-ticket verification information to the handheld device 3 (step S21) for the display of the handheld device 3, to show the e-ticket information (step S14) and for the ticket checking device 2 to check again (step S20). If the e-ticket information is verified to be false, then the e-ticket verification fails (step S22). If, in step S20, the ticket checking device 2 cannot verify the e-ticket verification information, then an alert is issued (step S20), thereby providing an e-ticket anti-counterfeiting effect in which the ticket service center 1 further sends a ticket verification information to the handheld device by: (1) a push notification service to send the e-ticket verification information to the handheld device 3; or (2) using a network communication record of the handheld device 3 communicating with a carrier, wherein the ticket service center 1 queries a database 4 of the carrier for reverse IP lookup of the dynamic IP to verify the phone number of the handheld device 3 and then returns the e-ticket verification information to the handheld device 3 according to the phone number or the dynamic IP; or (3) using a short message service (SMS) or a multimedia messaging system (MMS); or (4) using an e-mail service; or (5) when the handheld device 3 is connected to the ticket service center 1 via the network, the ticket service center 1 sends the e-ticket verification information to the handheld device via a unique identification (ID) generated by the ticket service center 1, wherein the unique ID is generated to identify the handheld device 3 and then the e-ticket verification information can be transmitted to handheld device 3; or (6) other communication mechanisms.

When the handheld device 3 receives an e-ticket verification information, the ticket software automatically shows the e-ticket verification information on the display of the handheld device 3 for the ticket checking device 2 to read and for the database 4 of the ticket service center 1 to verify whether it is the e-ticket shown on the handheld device, thereby assuring that the re-verification process is legitimate. Furthermore, if the e-ticket is copied by an image capturing device and misused, the anti-counterfeiting system issues an alert and notifies related personnel. The anti-counterfeiting system and method can therefore be used in a paperless e-ticket verification, access control, or other applications, wherein the e-ticket information can be an encrypted or non-encrypted text/number, barcode, image, OTP, or combination thereof, or can be a barcode image generated by the barcode encoding module of the handheld device 3 based on an encrypted or non-encrypted text/number, barcode, image, OTP, or combination thereof.

In addition to the above verification methods, when the handheld device 3 receives the e-ticket information or the e-ticket verification information, it can divide the e-ticket information or the e-ticket verification information into at least a first information and a second information. The e-ticket information or the e-ticket verification information can be divided according to the number of verifications. When verifying the e-ticket information or the e-ticket verification information for the first time, the first information is used for first verification. After the second information is verified by the ticket checking device 2, any one of the six communication mechanisms mentioned above (such as a push notification service) can be used for returning the second information to the handheld device 3 for showing the second information on the display of the handheld device 3, wherein the second information is used for re-verifying the e-ticket information or the e-ticket verification information.

If the e-ticket is further applied in a payment service using an ATM card or a credit card, the ticket service center 1 automatically replies with a transaction confirmation information to the handheld device 3 via the network (step S16) and lets the user choose what kind of card (ATM card, credit card, or other cards) and which card to use to pay for the transaction, such as deducting an amount from an ATM card or choosing a credit card for the transaction payment. The user can submit the card number and other data to the database 4 of the ticket service center 1 via the handheld device 3 (step S17) for the ticket service center 1 to check the validity of the card with a payment platform (provided by a card issuing bank or organization) (step S18). The card number and other data can be stored in a handheld device 3 or the remote database 4.

Therefore, when the user confirms the payment method and then agrees to the transaction, the ticket service center 1 determines whether the transaction is completed. If the payment method and card information are verified, the ticket service center 1 replies with a transaction message to indicate the status of the transaction to the handheld device 3 (back to step S15) to verify the validity of the transaction method, and vice versa.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An e-ticket anti-counterfeiting system, comprising:
    a ticket service center for providing an e-ticket application service;
    a ticket checking device comprising a communication module, an image module, and an recognizing module, wherein the image module identifies the e-ticket information or the e-ticket verification information on a display of the handheld device at least twice, and the recognizing module verifies whether the e-ticket information or the e-ticket verification information on the display of the handheld device is correct or valid;
    the handheld device comprising a transmission module and a ticket software, wherein the transmission module connects to the ticket service center via a network and obtains the e-ticket information or the e-ticket verification information for the recognizing module to verify the e-ticket information or the e-ticket verification information to be correct or valid; and
    a database comprising a comparing module, wherein the database stores a user information, handheld device information, or e-ticket transaction information.

2. The e-ticket anti-counterfeiting system as claimed in claim 1, wherein the e-ticket anti-counterfeiting system further comprises a payment platform for the handheld device to execute an electronic transaction application such as a payment through a credit card or ATM card.

3. The e-ticket anti-counterfeiting system as claimed in claim 1, wherein the handheld device further comprises a barcode encoding module for generating a barcode image for the e-ticket information or the e-ticket verification information, which is a one-time password (OTP) represented by at least one of a text, number, barcode, and image.

4. The e-ticket anti-counterfeiting system as claimed in claim 1, wherein the user information comprises an account, password, and e-mail address, the handheld device information comprises a phone number, an international mobile subscriber identify (IMSI), an international mobile equipment identity number (IMEI), and an IP, and the e-ticket transaction information comprises a ticket booking data, a purchasing data, and a user transaction behavior.

5. The e-ticket anti-counterfeiting system as claimed in claim 1, wherein the handheld device is a mobile phone, a tablet PC, a personal digital assistant (PDA), or another handheld device having a communication module.

6. An e-ticket anti-counterfeiting method, comprising the following steps:

executing a ticket software of a handheld device and using a transmission module of the handheld device to connect to a ticket service center via a network to submit an e-ticket service demand, and then obtaining at least an e-ticket information or an e-ticket verification information for the handheld device;

when the e-ticket information or the e-ticket verification information is read by a ticket checking device, connecting the ticket checking device to a comparing module of a database via a communication module for verifying the e-ticket information or the e-ticket verification information and, if true, sending a second e-ticket verification information to the handheld device via the ticket service center;

receiving the e-ticket verification information by the handheld device and showing the second e-ticket verification information on a display of the handheld device for the ticket checking device to verify the second e-ticket verification information; and when the handheld device receives the second e-ticket verification information, showing the e-ticket information or the e-ticket verification information on the display of the handheld device for an image module of the ticket checking device to receive an image of the e-ticket information or the e-ticket verification information, wherein the image is read by an identifying module of the ticket checking device and verified by the database connected with the communication module of the ticket checking device to determine whether the image is the e-ticket information or the e-ticket verification information shown on the display of the handheld device to verify whether the second e-ticket verification information is legitimate.

7. The e-ticket anti-counterfeiting method as claimed in claim 6, further comprising the following steps:

automatically replying with a transaction confirmation information by the ticket service center to the handheld device via the network to provide a transaction method by a credit card or a ATM card, wherein the transaction method is performed by sending a card information by the transmission module of the handheld device to the database of the ticket service center and verifying the validity of the card information, and sending the card information by the ticket service center to a payment platform via the network to verify the validity of the card information by a card issuing bank or organization, wherein the card information is stored in a storing module or a remote database via the network; and verifying the transaction method, if true, after agreeing to the transaction and selecting the credit card or ATM card to pay for the e-ticket, replying with a transaction message to indicate the status of the transaction to the handheld device to verify the validity of the transaction method.

8. The e-ticket anti-counterfeiting method as claimed in claim 6, wherein the ticket service center sends the e-ticket verification information to the handheld device via a push notification service, wherein the push notification service sends the e-ticket verification information back to the transmission module of the handheld device.

9. The e-ticket anti-counterfeiting method as claimed in claim 8, wherein the handheld device obtains the e-ticket information or the e-ticket verification information and divides the e-ticket information or the e-ticket verification information into a first information and a second information; when verifying the e-ticket information or the e-ticket verification information for the first time, the first information is used for first verification; after the second information is verified by the ticket checking device, a push notification service is used for returning the second information to the handheld device for showing the second information on the display of the handheld device; and wherein the second information is used for re-verifying the e-ticket information or the e-ticket verification information.

10. The e-ticket anti-counterfeiting method as claimed in claim 6, wherein the ticket service center sends the e-ticket verification information to the handheld device according to a network communication record of the handheld device, wherein the ticket service center queries a database of a carrier for reverse IP lookup of the dynamic IP to verify the phone number of the handheld device and then returns the e-ticket verification information to the handheld device according to the phone number or the dynamic IP.

11. The e-ticket anti-counterfeiting method as claimed in claim 6, wherein the ticket service center sends the e-ticket verification information to the handheld device via a short message service (SMS), a multimedia messaging system (MMS), or an e-mail service.

12. The e-ticket anti-counterfeiting method as claimed in claim 6, wherein the ticket service center sends the e-ticket verification information to the handheld device via a unique identification (ID) generated by the ticket service center when the handheld device is connected to the ticket service center via the network; and when the handheld device is connected to the ticket service center, the unique ID is generated to identify the handheld device.

13. The e-ticket anti-counterfeiting method as claimed in claim 6, further comprising the following steps:

sending the e-ticket information or the e-ticket verification information to the handheld device by the ticket service center, wherein the handheld device is connected to the ticket service center via the network for a registration process, wherein a plurality of unique IDs corresponding to a plurality of handheld devices is generated by the ticket service center, and when the handheld device is identified by the unique ID, the ticket service center sends the e-ticket information or the e-ticket verification information back to the handheld device via the transmission module of the handheld device.

* * * * *